United States Patent [19]
Olivo

[11] Patent Number: 5,711,082
[45] Date of Patent: Jan. 27, 1998

[54] FIXTURE LOCATOR

[76] Inventor: James M. Olivo, R.R. 1, Box 1533, Hop Bottom, Pa. 18824

[21] Appl. No.: 661,743

[22] Filed: Jun. 11, 1996

[51] Int. Cl.⁶ ................................................. G01B 5/00
[52] U.S. Cl. .................................... 33/528; 33/DIG. 10
[58] Field of Search ............................ 33/528, 529, 645, 33/DIG. 10, 666, 613, 1 CC

[56] References Cited

U.S. PATENT DOCUMENTS

| | | | |
|---|---|---|---|
| 3,522,658 | 8/1970 | Howell | 33/528 |
| 3,672,064 | 6/1972 | Elkins et al. | 33/DIG. 10 |
| 3,678,588 | 7/1972 | Isola et al. | 33/DIG. 10 |
| 3,808,690 | 5/1974 | Balder | 33/DIG. 10 |
| 3,842,510 | 10/1974 | Elliott | 33/528 |
| 4,059,907 | 11/1977 | Dauber | 33/528 |
| 4,144,651 | 3/1979 | De Baun | 33/42 |
| 4,212,110 | 7/1980 | Hill, Jr. | 33/528 |
| 4,228,592 | 10/1980 | Badger | 33/DIG. 10 |
| 4,285,135 | 8/1981 | Minozzi, Jr. | 33/528 |
| 4,338,724 | 7/1982 | Johnson | 33/528 |
| 4,423,555 | 1/1984 | Wootten | 33/528 |
| 4,696,113 | 9/1987 | Rice | 33/DIG. 10 |
| 4,998,355 | 3/1991 | Greene . | |
| 5,129,297 | 7/1992 | Bussi . | |
| 5,175,940 | 1/1993 | Naill et al. | 33/666 |
| 5,222,303 | 6/1993 | Jardine | 33/528 |
| 5,357,683 | 10/1994 | Trevino | 33/528 |
| 5,361,509 | 11/1994 | Wheeler, Sr. et al. . | |

FOREIGN PATENT DOCUMENTS

| | | |
|---|---|---|
| 440516 | 2/1927 | Germany . |
| 2710397 | 9/1978 | Germany . |
| 129611 | 1/1929 | Switzerland . |

*Primary Examiner*—Thomas B. Will
*Attorney, Agent, or Firm*—Richard C. Litman

[57] ABSTRACT

A fixture locator enables a worker to find, mark, and cut the exact location and dimensions of an electrical or other fixture installed behind a previously installed panel of a partially paneled wall or ceiling structure. The fixture locator is essentially a bifurcated elongate structure, with essentially identical front and back arms in precise registry with one another. The separated ends of the arms are configured to fit closely about an electrical outlet box, switch box, light box, or junction box, but may be configured to fit virtually any component. The opposite ends of the arms are secured together, preferably with a spacer therebetween which is at least as thick as the thickest panels with which the present fixture locator will be used, in order to provide adequate clearance between the two arms of the device. The device is used to locate fixtures and components which have been previously installed behind a partially paneled wall or ceiling structure, by passing the fixture locator over the edge of the installed panel with the back arm behind the panel and engaging the outlet box or component with the like configured end of the back arm. The identically configured front arm of the locator will then precisely indicate the outline of the fixture behind the panel, so it may be marked and cut for access. The fixture locator may be formed of any number of materials, including metal, plastic, and/or wood.

10 Claims, 3 Drawing Sheets

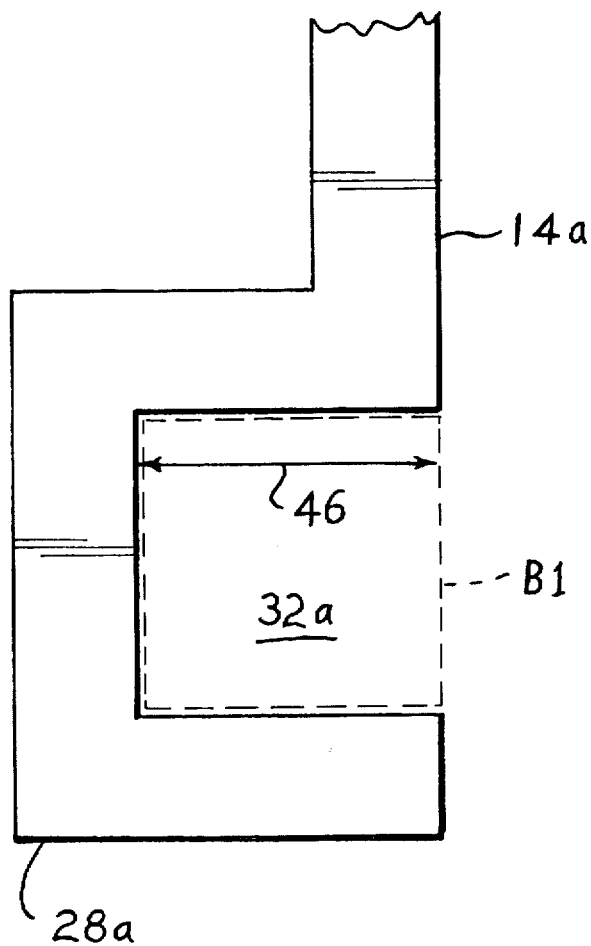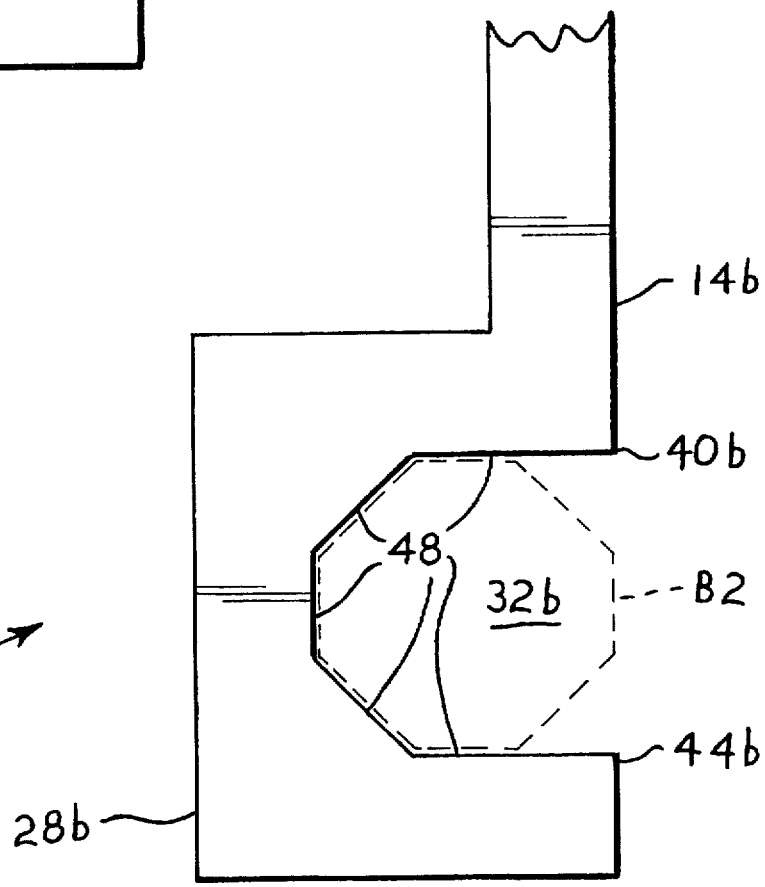

FIXTURE LOCATOR

BACKGROUND OF THE INVENTION

1. Field of the Invention

The present invention relates generally to tools and devices used in building construction, and more particularly to a device adapted to fit over a wallboard panel during building construction and to fit closely about an electrical receptacle or other fixture on the back side thereof. The present locator provides a duplicate arm configuration on the front side of the wallboard to allow a worker to trace the outline of the receptacle or fixture on the front of the wallboard accurately, so the wallboard panel need not be removed for cutting and then reinstalled.

2. Description of the Prior Art

With ever increasing wages, labor has become one of the largest expenses, if not the largest expense, in building construction. As most aspects of building construction require individual skilled labor, the labor costs are correspondingly high. Various developments have taken place in construction in attempts to reduce costs, or at least to delay their increase, such as the development of various wallboard materials, such as gypsum wallboard, also known as drywall or "Sheetrock" (tm), to provide some degree of prefabrication during the construction process.

While the use of such wallboard greatly accelerates the interior finishing of a structure in comparison to lath and plaster type construction, it still requires a fair amount of reasonably skilled labor. One area where such skill is critical, is in providing accurate cutouts for electrical receptacle and switch boxes and the like, as well as passages for water and gas lines and the like. Heretofore, the procedure generally has been to position the wallboard panel temporarily in place as desired, mark the panel with the location of the structure to be accessed through the panel, remove the panel from the wall structure, cut out the appropriate opening in the panel according to the marks previously made, and reinstall the panel permanently in place on the wall. As one can see, the duplication of installing the panel on the wall structure twice (once temporarily and once permanently) results in additional time and labor costs which would not be incurred if the panel could be installed only once, permanently.

Accordingly, a need arises for a fixture locator which finds the location of an electrical fixture or other structure on the blind side of a permanently installed wallboard panel, thereby eliminating the need to remove the panel to cut a hole therethrough. The fixture locator must be light in weight yet durable, to provide for ease of use and yet withstand the rigors of the construction environment. Moreover, the device must be simple to use in order to reduce the time required as much as possible, and should require no measurement or calculation. A review of the prior art of record and its differences is provided following.

U.S. Pat. No. 3,522,658 issued to John F. Howell on Aug. 4, 1970 describes an Electrical Outlet Box Locator, comprising a telescoping pipe extendible between floor and ceiling next to a wall, with a series of adjustable arms extending therefrom. The distal end of the outermost arm includes a template which is adjustably positioned over an installed outlet box. The arms are then swung away from the wall without disturbing the settings, and a wall panel is installed. The arms are then repositioned with the template directly over the electrical box, to enable a worker to cut an accurate hole through the installed panel. While the Howell device does provide for a wall panel to be installed only once with no requirement for removal, it is cumbersome and there is some question of any real savings of time being provided by the device.

U.S. Pat. No. 3,672,064 issued to Johnny C. Elkins et al. on Jun. 27, 1972 describes an Indexing Means For Wall Panel Openings, essentially comprising a pair of orthogonally disposed folding rules or retractable tapes adjustably extending from a box. The box is positioned over the exposed fixture, and the two legs are extended to a respective floor and corner of the structure. The device is then removed and placed in the corresponding position on the wall panel, with the outline of the fixture being marked about the box of the device. No means is provided by Elkins et al. to lock the device in position on the panel to be marked, thus requiring great care to confirm that the box is accurately positioned. The device does not straddle a previously installed panel, as provided by the present invention.

U.S. Pat. No. 3,678,588 issued to Raymond O. Isola et al. on Jul. 25, 1972 describes a Wall Outlet Box Locator having a general configuration somewhat like a T-square. An electrical box template is slidably installed along the stem of the T. The device requires the paneling to be installed horizontally, with the upper row of panels being installed first so the lower mounted electrical boxes remain exposed. The crossmember of the T is pressed against the lower edge of the installed panel, with the template being adjusted to coincide with the distance of the box below the lower edge of the panel. This dimension may then be transferred to a panel to be installed thereover. However, Isola et al. make no provision for locating the box cutout laterally in the uninstalled panel, as indicated in col. 2, lines 61–64 of their patent. Their device provides only a partial solution to the problem, and does not straddle the panel as does the present device.

U.S. Pat. No. 3,842,510 issued to Bill J. Elliott on Oct. 22, 1974 describes an Electric Outlet Box Locator comprising a windowed plate with a pair of orthogonally disposed clips thereon, adapted to receive conventional tape measures. The device is similar to the second embodiment of the Elkins et al. device discussed further above. The tapes are extended and locked with the ends abutting some structure against which the new panel will be installed, and with the plate window positioned over the outlet box. The device is then transferred to the new panel, with the hooked ends of the tapes being placed over the edges of the panel to position the window accurately.

U.S. Pat. No. 4,059,907 issued to Howard Dauber on Nov. 29, 1977 describes an Electrical Outlet And Switchbox Locator, comprising an orthogonal telescoping frame structure. The frame is adjusted over the area in which the panel is to be installed and lateral members are slidably positioned at the height of the electrical box(es), with template(s) being slidably positioned therealong and over the box(es). The device is removed and repositioned over the subject panel, and the location(s) of the box(es) marked according to the positioned template(s). The device must be at least partially readjusted for removal from in front of the panel area, thus requiring some readjustment over the subject panel. The device is cumbersome and similar to the device of the Howell patent discussed further above, and cannot straddle an installed panel to duplicate the location of a fixture on the back thereof, as is accomplished by the present invention.

U.S. Pat. No. 4,285,135 issued to Michael F. Minozzi, Jr. on Aug. 25, 1981 describes a Panel Cutting Guide comprising a single vertical member with a pair of horizontal members slidably secured thereto. The vertical member is placed on the floor and across the electrical box, and the horizontal members are adjusted to lie across the top and bottom edges of the box. One of the horizontal arms is extended to contact a nearby reference point (edge of adjacent panel, etc.). The apparatus is then removed and placed on the subject panel, whereupon the location of the box may be marked. The device is somewhat like a refinement of the Isola et al. device discussed further above, and cannot straddle a panel.

U.S. Pat. No. 4,423,555 issued to Doyle F. Wootten on Jan. 3, 1984 describes a Device For Measuring Cuts In Wall Paneling And The Like, comprising a telescoping vertical member with a series of multiply jointed arms extending therefrom. The vertical member is removably installed between suitable structural members, and the arms adjusted to locate their distal ends at various points of the openings to be marked. As no actual templates are provided, the device is incapable of transferring the exact peripheries of the objects requiring cutouts in the subject panel, but only of transferring a few points (corners, etc.) thereof. The worker must still make careful measurements of the subject openings, and transfer those measurements to the subject panel, in order to provide the complete locations for the cutouts.

U.S. Pat. No. 4,696,113 issued to George Rice on Sept. 29, 1987 describes an Apparatus For Locating The Outline Of An Accessory In Dry Wall Or A Decorative Panel. The device comprises a vertical arm which is removably tacked to a wall stud, and an adjustable horizontal arm with various templates adjustably attachable thereto. Once the template has been positioned, the vertical arm must be removed from the stud and the device positioned on the panel to transfer the location for the cutout. This is similar to conventional procedure, except that the Rice apparatus, rather than the subject panel, is removably installed to the wall structure to mark the cutout(s). As in the case of the various other devices discussed above, the Rice device cannot straddle a panel to provide transfer of the location of a fixture.

U.S. Pat. No. 4,998,355 issued to Teddy R. Greene on Mar. 12, 1991 describes an Apparatus And Method For Positioning Opposing Marks On Opposing Surfaces, comprising a folded sheet having a plurality of holes therethrough. Each of the holes in the first half is in registry with a corresponding hole in the second half. The device is adapted for locating like positioned holes in different surfaces, but cannot be used to locate the position of an existing structure and for the transfer of the location of that structure to a panel, as provided by the present invention.

U.S. Pat. No. 5,129,297 issued to Aldo A. Bussi on Jul. 14, 1992 describes a Method And Apparatus For Locating Utility Structures Behind Construction Panels. The apparatus comprises a plurality of threaded points having hexagonal cross sections above the threads. The devices are threaded into the threaded plate attachment holes of the subject electrical box or the like with the points protruding therefrom, and the subject panel is forced over the points and permanently secured to the wall structure, thereby causing the points to protrude from the front of the panel. The points may then be removed using a conventional hexagonal socket, and an outlet box access hole cut in the panel. The problem with this apparatus and method is that most such boxes do not have a threaded screw hole defining each corner thereof, and hence the Bussi points can only define the location of the screw holes, and not the entire box. A worker must make one or more rough cuts from the holes developed by the points, and then finish the opening, thus requiring several steps.

U.S. Pat. No. 5,175,940 issued to David A. Naill et al. on Jan. 5, 1993 describes a Blind Hole Finder generally comprising a C-shaped strap having an extension on each end. One end has a hole engaging pin, while the other has a punch pin in registry with the hole engaging pin. The Naill et al. and other similar known devices are not adapted to provide for the location of fixtures behind a wall panel, as only one locating pin is provided, which must engage a cooperating passage (rivet hole or the like). While some electrical fixture boxes and the like may include a relatively large passage in the back wall thereof for electrical wiring, such wiring is universally installed before the wallboard panels are installed, and thus no opening for the engagement of a fitting would be available. The present invention recognizes this problem, by providing mating templates to fit around the concealed structure, and to outline that structure on the front of the panel.

U.S. Pat. No. 5,222,303 issued to Stuart A. Jardine on Jun. 29, 1993 describes a Template For Marking The Location Of Junction Boxes, comprising an extension having a window in the shape of an electrical box therein. The lower end of the extension is placed on the floor, with the window outlining the desired location of a fixture to be installed. The device is extremely limited in its capability for locating a fixture behind an installed panel, as it is only adapted for the marking of installed fixture locations at a single predetermined distance above the floor, and attached to a wall stud. The present fixture locator can locate fixtures behind installed panels, regardless of their specific position.

U.S. Pat. No. 5,361,509 issued to Charles H. Wheeler, Sr. et al. on Nov. 8, 1994 describes an Electrical Box Installation Tool, comprising a telescoping vertical column with a box holder adjustably placed thereon. The holder provides adjustment for the depth of the box relative to the stud to which it is to be mounted, and for the thickness of any wall paneling to be installed thereover. The device is not capable of providing for the marking or cutting of any wallboard to be installed over the box, as provided by the present invention, much less providing for such cutting or marking for fixtures not installed at a specific distance above the floor and on a wall stud. The present fixture locator is capable of accurately indicating the location of a fixture on the back of an installed panel, no matter what the location of that fixture may be.

German Patent Publication No. 440,516 to Heinrich Busch and published on Feb. 5, 1927 illustrates a vertically adjustable bracket having a horizontally adjustable guide disposed at right angles to the vertical adjustment. No panel marking or cutting guide is evident.

German Patent Publication No. 2,710,397 to Kurt Zeitvogel and published on Sep. 14, 1978 illustrates a plug or cap construction, apparently installable in a panel. No means is evident to mark or cut a panel corresponding to a fixture on the concealed side thereof, as provided by the present invention.

Finally, Swiss Patent Publication No. 129,611 to Franz Hoen and published on Jan. 2, 1929 illustrates a double ended square including right triangle and protractor attachments therefor. While the device may be useful in measuring the location of a fixture relative to a wall structure, and marking the fixture location on a panel to be installed thereover, the device is not capable of directly locating the position of a fixture behind an installed panel and duplicating that position on the opposite front surface of the panel, as provided by the present invention.

None of the above inventions and patents, taken singly or in combination, is seen to describe the instant invention as claimed.

SUMMARY OF THE INVENTION

Accordingly, it is a principal object of the invention to provide an improved fixture locator adapted to be positioned around a fixture disposed behind an installed panel, and to provide the exact location of that fixture on the opposite front side of the panel for the precise cutting of the panel for fixture access.

It is another object of the invention to provide an improved fixture locator which is particularly adapted to provide the exact location of electrical outlet boxes, switch boxes, and light fixture boxes, but which is also adapted to provide the location of other components, such as plumbing and electrical conduits.

It is a further object of the invention to provide an improved fixture locator which may be used to locate fixtures behind partially paneled walls and ceilings.

An additional object of the invention is to provide an improved fixture locator having a substantially identical front portion and back portion in exact registry with one another and secured together at one end thereof by spacing means providing clearance for a panel thickness therebetween, with the back portion adapted to fit around a concealed fixture and the front portion adapted to provide an exact outline of the concealed fixture.

Still another object of the invention is to provide an improved fixture locator which may be formed of various materials, including metal, plastic, and wood.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a partial front elevation view of a second embodiment of the present fixture locator, adapted to indicate the location and dimensions of a double width electrical box.

FIG. 4 is a partial front elevation view of a third embodiment of the present fixture locator, adapted to indicate the location and dimensions of an octagonal electrical box.

Similar reference characters denote corresponding features consistently throughout the attached drawings.

DETAILED DESCRIPTION OF THE PREFERRED EMBODIMENTS

Figure 1:
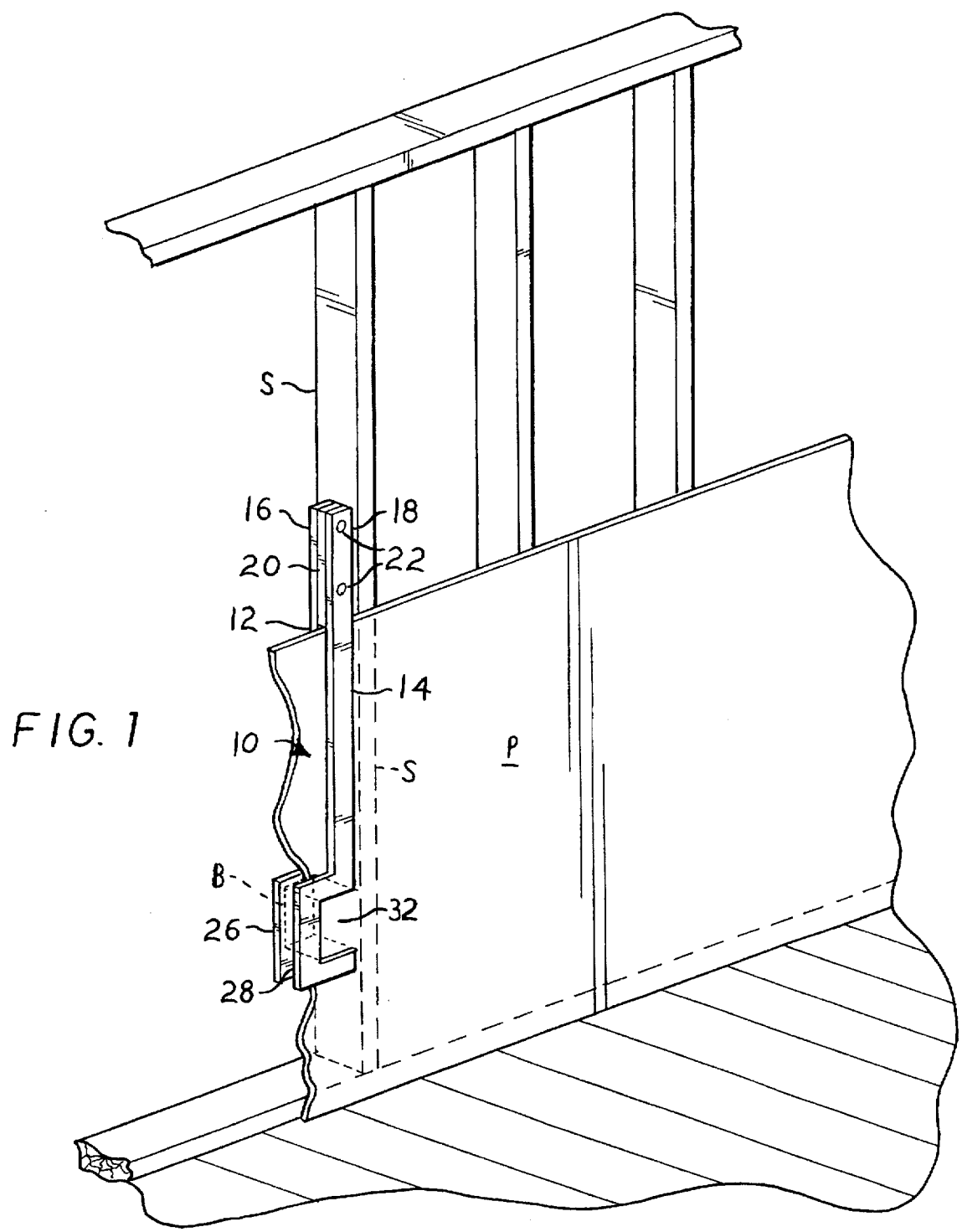
FIG. 1 is an environmental front perspective view of the present fixture locator, showing its use.

Referring now to FIG. 1 of the drawings, the present invention will be seen to comprise a fixture locator 10, which is adapted to straddle a wall panel P in partially completed wall construction, in order to locate a previously installed fixture (electrical outlet box, etc.) therebehind. The fixture locator 10 comprises a bifurcated device having a first arm 12 and identical second arm 14, which arms 12 and 14 are joined at their respective first ends 16 and 18. Each of the arms 12 and 14 are preferably formed of a thin, wide, and flat sheet of material, with the width of each of the arms 12 and 14 serving to resist lateral bending.

A spacer 20 may be provided between the two first ends 16 and 18 of the two spaced apart and parallel arms 12 and 14, with the spacer 20 preferably being sufficiently thick as to allow the present fixture locator 10 to straddle the thickest wallboard or wall panels normally used in interior construction, i.e., at least three quarters of an inch. The two essentially identical arms 12 and 14, and the spacer 20, may be permanently and immovably secured together by means of rivets 22, screws 24 (FIG. 2), adhesive bonding, etc., as appropriate for the materials used.

Figure 2:
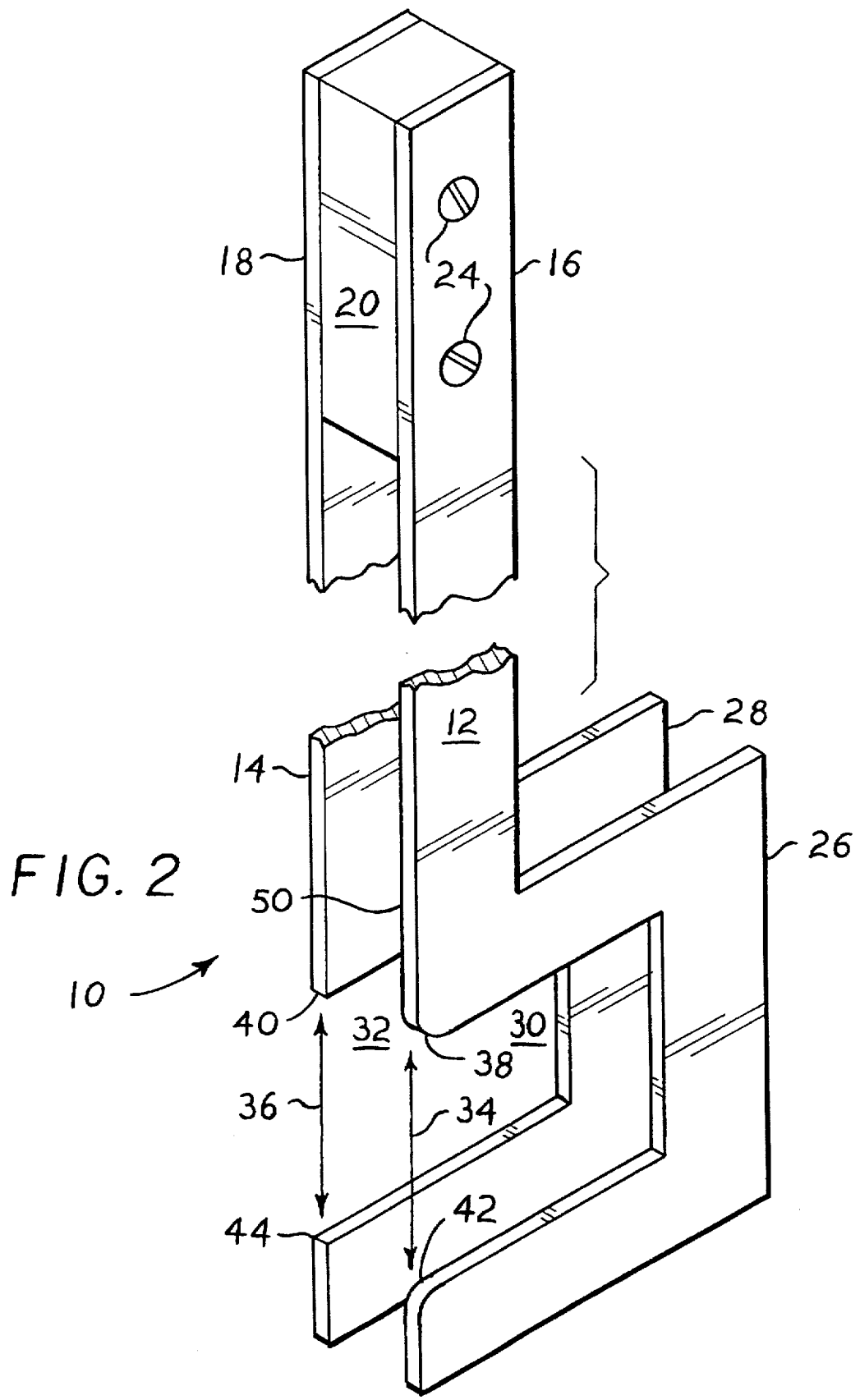
FIG. 2 is a broken rear perspective view of the fixture locator, showing various details of its construction.

Each of the arms 12 and 14 are joined at their first ends 16 and 18 so as to lie in exact overlying and underlying registry with one another, and each arm 12 and 14 has a spaced apart second end, respectively 26 and 28, opposite their respective first ends 16 and 18. Each of the essentially identical second ends 26 and 28 includes a laterally offset relief, respectively 30 and 32, formed therein. (The first relief 30 is concealed in FIG. 1 of the drawings, but is shown in FIG. 2.) These reliefs 30 and 32 are in exact overlying and underlying registry with one another, as with the remainder of the fixture locator 10, and are configured to fit closely about the outer periphery of an electrical outlet box B or other fixture. (It should be noted here that the term "fixture" is intended to cover such components as electrical outlet boxes, switch boxes, light boxes, and junction boxes of various shapes and sizes, with the reliefs being correspondingly configured as required, and as indicated e.g. in FIGS. 3 and 4. It will be seen that the present locator tool 10 in one or more of its various embodiments may also be used to locate other components, such as gas and plumbing lines, etc.).

In the example of FIG. 1, the reliefs 30/32 are configured to fit closely about three of the four sides of a conventional single width electrical outlet box B, shown in broken lines behind the wall panel P and attached to the vertical stud S. The box B is secured to the left side of the stud S, but it will be seen that the orientation of the fixture locator 10 need only be reversed to accommodate boxes B secured to the right side of a stud S.

FIG. 2 provides a detailed perspective view of the second ends 26 and 28 and the reliefs 30 and 32 of the fixture locator tool 10 of FIG. 1. (The view of FIG. 2 is opposite that of FIG. 1, with the first arm 12 in front of the second arm 14.) The mouths or openings 34 and 36 respectively of the two reliefs 30 and 32, are each defined by an upper or first corner, respectively 38 and 40 for the first and second reliefs 30 and 32, and an opposite lower or second corner, respectively 42 and 44 for the first and second reliefs. The span of the openings 34 and 36 between the respective first and second corners of each of the reliefs 30 and 32, is just sufficient to fit closely about the top and bottom walls of a conventional rectangular light switch or electrical outlet box B or the like, as shown in FIG. 1. The lateral depth of each of the reliefs 30 and 32 is just sufficient for the first and second corners 38 and 42 of the first relief 30 to meet with a stud S to which the box B may be secured, or in other words, just equal to the width of the box B.

As the fit of the first relief 30 about such an electrical box B is relatively close in order to provide the desired accuracy, it may prove difficult to pass the first relief 30 about the box B. Accordingly, the first and second corners 38 and 42 of the first relief 30 may be radiused, to facilitate starting the second end 26 of the first arm 12, with its relief 30, about the box B. While rounded corners are not required for the second relief 32, such may be provided if desired to provide ease of reversibility for the fixture locator tool 10.

FIGS. 3 and 4 respectively provide partial front elevation views of two alternate embodiments of the present fixture locator, respectively designated as 10a and 10b. (Only the second ends of the second arms are shown in FIGS. 3 and 4, as the second ends of the first arms are concealed behind the second arms due to the exact registry of the essentially identical first and second arms.)

In FIG. 3, The fixture locator 10a includes a second end 28a with a relief 32a having a lateral depth 46 twice that of the relief 30/32 of the fixture locator 10 of FIGS. 1 and 2. This lateral depth 46 is exactly equal to the width of a conventional double width electrical box B1 having an essentially square shape, as indicated in broken lines in FIG. 3. The three sides of the square relief 32a will be seen to fit closely about three of the four sides of such a square electrical box B1, thus positioning the second end 28a of the second arm 14a accurately about the box B1 in order to locate its position behind a wall panel P.

The embodiment 10b of FIG. 4 is configured to fit closely about five of the eight sides of a conventional octagonal electrical box B2, as often used for light fixtures and junction boxes. The relief 32b is defined by a semi-octagonal periphery 48 formed within the second end 28b of the second arm 14b, having five sides. The sixth, seventh, and eighth sides of the octagon shape remain open, to provide lateral clearance about the octagonal box B2. The first and second corners 40b and 44b will align with any structure to which the box B2 is secured, essentially as described further above for the fixture locator 10 of FIGS. 1 and 2.

The present fixture locator in its various embodiments is particularly useful in interior construction where wall panels P are installed horizontally over an interior wall frame, with only the lower panel P being installed and access to the wall cavity being provided by the open area above the installed lower panel P. Returning to FIG. 1 of the drawings, the fixture locator 10 is placed over the upper edge of the panel P to straddle the panel, with the first arm 12 being placed within the wall cavity behind the panel P and the opposite, parallel second arm 14 to the outside of the wall structure along the opposite surface of the panel P. At this point, the user maneuvers the locator 10 to place the first relief 30 about the electrical box B, with the first and second corners 38/42 abutting the corners of the box B adjacent the wall stud S or other structure to which the box B may be secured.

As the relief 30 is adapted to fit very closely about the contours of the box B, it will be seen that little or no play will occur throughout the fixture locator 10 when it is positioned closely about the box B. The leading edge 50 (shown in FIG. 2) of the first arm 12 will abut the wall stud S to which the box B is secured when the box B is completely seated within the relief 30. (It should be noted that the lower end of the spacer 20 will generally not contact the upper edge of the panel P when the first relief 30 is secured about the box B, as shown in FIG. 1. Preferably, the arms 12/14 are sufficiently long as to provide extension to both sides of the panel P to a point near the lower edge of the panel P.)

With the leading edge 50 of the first arm 12 parallel to and abutting the wall stud S, the user of the present fixture locator 10 is assured that the first relief 30 is completely seated about the electrical box B, and as the second relief 32 disposed against the outer surface of the panel P is in precise registry with the first relief 30, is further assured that the inner periphery of the second relief 32 forms a precise outline of the location of three of the four sides of the box B on the opposite side of the panel P. Thus, the user may mark the precise location of the box B, using the three sides of the second relief 32 as a marking guide. A straightedge laid across the second relief opening 36 will provide an accurate guide for marking the fourth side of the box B. At this point, the fixture locator 10 may be removed from its position straddling the panel P, and the cutout for the box B made by cutting along the previously marked lines on the panel P, without need to remove the panel P from its installed position.

It will be seen that the present fixture locator, in any of its various embodiments, may be used for locating fixtures in ceiling installations, as well as walls. So long as sufficient access room is provided behind a panel for the first arm of the locator to reach the subject fixture, the locator may be used between wall studs, ceiling joists, etc. Moreover, the reversibility of the locator has been described above, and it should be noted that the locator may be used to fix the position of fixtures mounted to either side of a structural member, so long as access to the fixture exists.

While the specific embodiments shown in the drawing figures are directed to specific electrical box configurations, it should be noted that other relief configurations may be provided for other specific fixture shapes, as desired. In fact, the various square and rectangular shapes discussed herein are also well suited for locating round fixtures (plumbing lines, gas lines, electrical conduit, etc.) where they will pass through a panel. The round fixture need only be placed in one corner of the first relief, with the corresponding corner of the second relief on the opposite side of the panel defining a 90 degree arc of the circular shape. A pipe or other convenient article having a circular cross section of the same diameter as the hidden fixture may then be placed in the corresponding second relief corner, and traced therearound to mark the location of the hidden fixture on the inside of the panel.

In summary, the present fixture locator, in its various embodiments, will be seen to provide a most useful time saving device for interior finishing workers and the like. Wall panels may be initially installed permanently, with no need for subsequent removal, as the locator quickly and clearly indicates the precise location of a fixture hidden behind the installed panel. The locator may be made relatively inexpensively, of plastic, wood, or other inexpensive material, but greater durability will be provided by using a durable metal, such as aluminum, steel, or stainless steel, as desired. In whatever form, the present fixture locator will be seen to pay for itself in short order, due to the ease and speed of use and elimination of multiple installations of panels.

It is to be understood that the present invention is not limited to the sole embodiments described above, but encompasses any and all embodiments within the scope of the following claims.

I claim:

1. A fixture locator, comprising:
    a bifurcated tool having a first arm and a second arm, with said first arm and said second arm being substantially identical to one another and being in exact overlying and underlying registry and parallel with one another;
    said first arm and said second arm each having a first end and an opposite second end, with said first end of each said arm being immovably affixed together and said second end of each said arm being separated from one another and respectively having a first and a second laterally offset relief formed therein;
    said first relief being configured to fit closely about the majority of the periphery of a fixture installed behind an installed wall panel in a partially paneled structure, and said second relief being configured to provide a precise outline of the fixture on the front of the wall panel in exact registry with the fixture when said fixture locator is positioned to straddle the installed wall panel of the partially paneled structure with said first relief fitting closely about the periphery of the fixture.

2. The fixture locator according to claim 1, wherein:

each said arm of said fixture locator comprises a thin, wide, and flat component adapted to resist lateral deflection, with at least said first arm having a thickness adapted to fit within a narrow wall cavity.

3. The fixture locator according to claim 1, including:

a spacer affixed between said first end of each said arm.

4. The fixture locator according to claim 3, wherein:

said spacer has a thickness of at least three quarters of an inch.

5. The fixture locator according to claim 1, wherein:

each said first end of said first arm and said second arm are affixed together by fastening means selected from the group consisting of threaded fasteners and rivets.

6. The fixture locator according to claim 1, wherein:

each said relief includes an opening thereacross defined by a first corner and an opposite second corner, with said first corner and said second corner of at least said first relief each having a radius formed thereon adapted to facilitate the passage of at least said first relief about a fixture.

7. The fixture locator according to claim 1, wherein:

each said relief has a substantially rectangular configuration adapted to fit closely about a conventional standard width electrical box.

8. The fixture locator according to claim 1, wherein:

each said relief has a substantially square configuration adapted to fit closely about a conventional double width electrical box.

9. The fixture locator according to claim 1, wherein:

each said relief has a partially octagonal configuration adapted to fit closely about five sides of an octagonal electrical box.

10. The fixture locator according to claim 1, wherein:

said fixture locator is formed of materials selected from the group consisting of aluminum, steel, stainless steel, plastic, and wood.

* * * * *